United States Patent Office 3,052,731
Patented Sept. 4, 1962

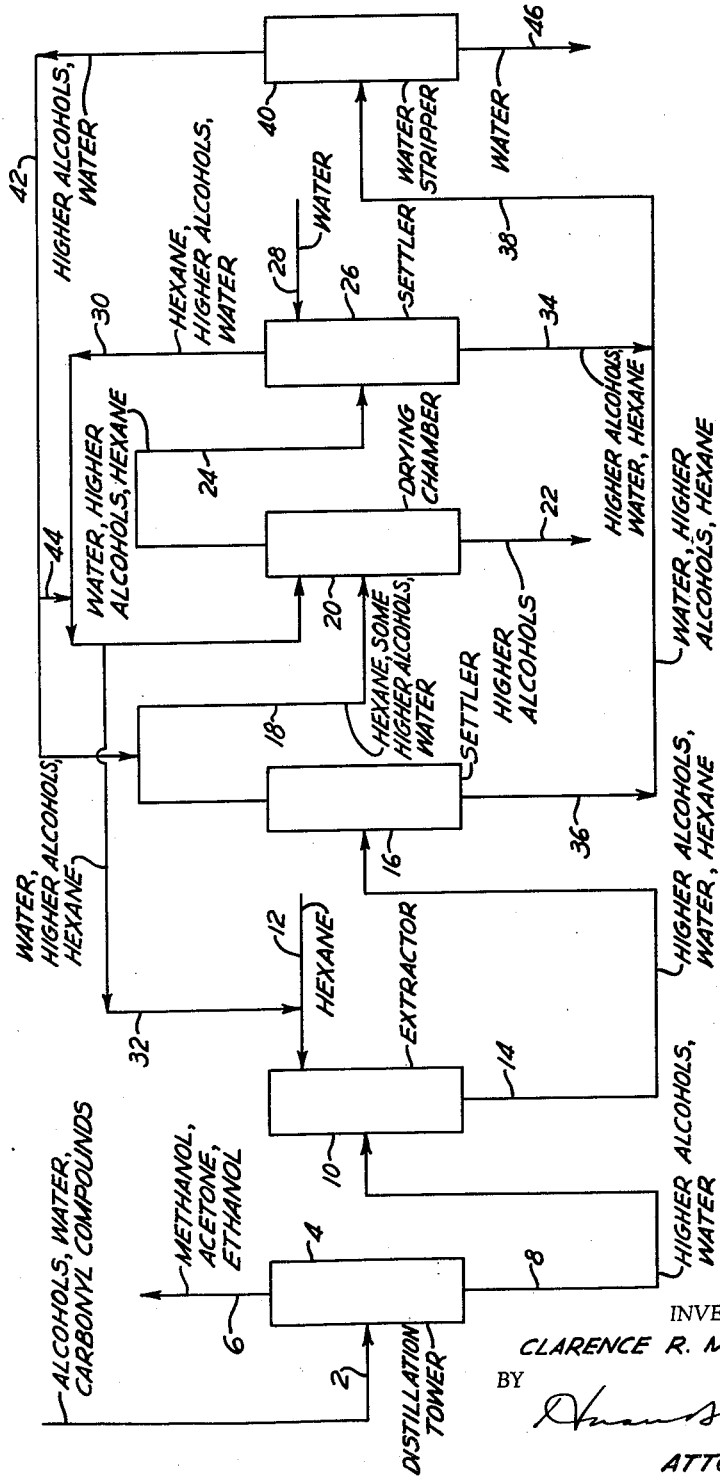

---

3,052,731
PROCESS FOR PURIFYING HIGHER ALCOHOLS OBTAINED FROM THE OXIDATION OF HYDROCARBONS
Clarence R. Murphy, Allison Park, Pa., assignor to Gulf Research & Development Company, Pittsburgh, Pa., a corporation of Delaware
Filed Aug. 3, 1959, Ser. No. 831,219
5 Claims. (Cl. 260—643)

This invention relates to a process for purifying higher alcohols and more particularly to a process for purifying a mixture of higher alcohols obtained as a result of the partial oxidation of normally gaseous hydrocarbons such as propane.

The partial oxidation of normally gaseous hydrocarbons results in an oxygenated mixture comprising formaldehyde, acetaldehyde, methanol, higher alcohols such as isoethanol, isopropanol, n-propanol and butanols such as isobutanol, secondary butanol and normal butanol, acetone, acetals, ethylene and propylene oxides, water, etc. Formaldehyde, acetaldehyde and methanol, generally in the order named, are separated from the oxygenated mixture, leaving a resulting mixture rich in higher alcohols. The individual alcohols in said resulting mixture are of course valuable in themselves or are useful in admixture with each other as solvents. Recovery of higher alcohols, alone or mixtures thereof, from said resulting mixture is complicated by the fact that the water, which is admixed therewith, is difficult to separate therefrom.

I have found that a mixture of higher alcohols, as defined above, can be recovered substantially pure and substantially free of water from a mixture containing said higher alcohols and water by a process which comprises extracting the mixture with hexane and thereafter separating hexane from the extract obtained to recover a substantially water-free mixture of higher alcohols. In its preferred embodiment, the mixture being treated is one which has been obtained as a result of the partial oxidation of a normally gaseous hydrocarbon, such as propane. Formaldehyde and acetaldehyde are then separated from said mixture. The resulting mixture is subjected to hydrogenation conditions and the methanol is subsequently separated by fractionation from said resulting mixture at a temperature of about 160° to about 170° F. at atmospheric pressure; the remainder is extracted with hexane; the extract containing hexane, the higher alcohols and a small amount of water is separated from the bulk of the water; the extract is fractionated to recover separately therefrom substantially water-free higher alcohols and an azeotrope containing water, hexane and a small amount of higher alcohols. In order further to recover the small amount of higher alcohols in said azeotrope, desirably said azeotrope is treated with water to upset the equilibrium of said azeotrope. Substantially all of the hexane and substantially all of the alcohol in said azeotrope are thereby recovered and a portion thereof recycled to the zone where said azeotrope was formed. The remaining portion of the hexane and alcohol which is not thus recycled can be recycled if desired to the hexane extractor. The remaining water, hexane and the higher alcohols which were in said azeotrope, plus the additional water which was employed to upset the azeotrope, are combined with the water separated from the hexane extract and sent to a water stripper where water is separated therefrom. The remainder of the material in the water stripper, which includes higher alcohols, hexane and some water, is thereafter recycled to the zone wherein said azeotrope was formed.

The present invention can further be illustrated by reference to the accompanying drawing which is hereby incorporated in the present specification.

The mixture being treated herein, in its preferred embodiment, is one which has been obtained as a result of the partial oxidation of a normally gaseous hydrocarbon such as propane and from which formaldehyde and acetaldehyde have been separated therefrom as set forth in detail in my patent application Serial No. 845,459 filed October 9, 1959 which method is hereby incorporated herein by reference. Briefly, in said application a normally gaseous hydrocarbon such as ethane, propane or butane is subjected to partial oxidation at an elevated temperature and an elevated pressure. The product thus obtained is extracted with water to remove formaldehyde therefrom. The product remaining is thereafter subjected to fractionation to remove acetaldehyde therefrom. The resulting produce is thereafter subjected to hydrogenation conditions in order to convert aldehydes, ketones and acetals to the corresponding alcohols. After such treatment the hydrogenated product contains no more than about 5, preferably no more than about 3 percent by weight of carbonyl compounds.

Referring to the flow diagram, the hydrogenated product as obtained in said U.S. patent application Serial No. 845,459 referred to above, in line 2 is passed to fractionator or distillation tower 4 wherein methanol and carbonyl-containing compounds boiling up to about 160° to about 170° F. are separated therefrom. This can be done by maintaining a top temperature in distillation tower 4 of about 160° to about 170° F. and a pressure of about 0 to about 5 pounds per square inch gauge. As a result of such treatment a mixture rich in methanol and containing small amounts of contaminants such as acetone and ethanol is removed from distillation tower 4 by line 6 and can be subjected to further treatment, for example, as set forth in said U.S. patent application Serial No. 845,459.

The remainder of the product in distillation tower 4 is removed from the bottom thereof by line 8. A typical product in line 8 can have the following composition:

| Compound: | Percent by Weight |
|---|---|
| Acetaldehyde | 0 to 4 |
| Methanol | 1 to 15 |
| Ethanol | 20 to 50 |
| Isopropanol | 8 to 30 |
| n-propanol | 2 to 20 |
| Butanols | 0.5 to 6 |
| Miscellaneous Acetals | 0 to 3 |
| Water | 1 to 50 |

The higher alcohols in this product, namely ethanol, isopropanal, n-propanal and butanols, are desirable individually or collectively. The amounts of acetaldehyde and acetals present are small and can be tolerated. For purpose of this treatment a small amount of methanol may have a tendency to remain with the higher alcohols, but no appreciable difficulty is experienced thereby since the methanol can eventually be separated from the higher alcohols if desired. The difficulty involved in the purification step under consideration resides in the removal of water from such product. In the event separation of water from the mixture is attempted by extracting the same with benzene, the higher alcohols in the mixture solubilize the lower alcohols and will form an emulsion with the water. A phase separation cannot therefore be obtained. Other solvents which might be employed are also unsatisfactory. Heptane, for example, is unsatisfactory because it possesses a poor extraction efficiency and will have a tendency to remain with the higher alcohols. Pentane is unsuitable since it does not entrain sufficient water with the higher alcohols to render it commercially feasible. In addition, with such solvents an appreciable amount of the higher alcohols will be lost with the water which is removed therefrom.

While the use of hexane involves the use of a distinct recovery and separation system, I have found that the higher alcohol mixtures defined above can be extracted with the same with extreme efficiency and with no appreciable loss of said higher alcohols in the water separated therefrom. This can be done by passing the higher alcohol stream in line 8 to extractor 10 which is maintained at a temperature on the order of about 35° to about 200° F. and a pressure, for example, of about 0 to about 100 pounds per square inch gauge sufficient to maintain the contents in liquid phase. Also introduced into extractor 10 by line 12 is hexane in a weight ratio relative to said higher alcohols of about 1:1 to about 10:1, preferably about 4:1 to about 5:1. After a residence time in extractor 10, during which time the hexane and higher alcohol mixture are intimately mixed by any suitable means, the mixture obtained is removed from extractor 10 by line 14 and passed to settler 16 which is maintained at a temperature of about 35° to about 200° F. and a pressure, for example, of about 0 to about 100 pounds per square inch gauge. A two-phase separation thus occurs in settler 16, an upper phase containing the bulk of the hexane, some higher alcohols and some water, and a lower phase containing the bulk of the water, some higher alcohols, and hexane.

The upper phase in settler 16 is removed therefrom by line 18 and passed to a drying tower 20 which is maintained at a temperature of about 120° to about 140° F. and a pressure of about 0 to about 50 pounds per square inch gauge. As a result of such treatment the desired dry alcohol mixture containing ethanol, isopropanol, n-propanol and butanols is removed from the base of drying tower 20 by line 22. This mixture can be employed as such as a solvent or can be separated into its individual components as desired.

The water, higher alcohols not removed in the bottom product and hexane, under the conditions existing in drying chamber 20, will azeotrope therein and be removed overhead therefrom by line 24 and passed to settler 26 which is maintained at a temperature of about 50° to about 150° F. and a pressure of about 0 to about 50 pounds per square inch gauge sufficient to maintain a liquid phase therein. Also introduced into settler 26 by line 28 is about 0.5 to about 30 percent by weight of water, based upon the azeotrope, sufficient to upset the equilibrium of said azeotrope and permit a phase separation to occur. The bulk of the hexane and higher alcohols and a small amount of water are removed overhead by line 30 and a portion thereof is recycled to drying chamber 20. The remainder in line 30 can be recycled to hexane line 12 by line 32 or sent to storage if desired.

The remaining alcohols, water and hexane in settler 26 are removed therefrom by line 34 and are joined by the mixture removed from settler 16 by line 36. The resulting mixture in line 38 is passed to a water stripper 40 which is maintained at a top temperature of about 160° to about 180° F. at about atmospheric pressure. Under such conditions a mixture containing higher alcohols and water is removed overhead by line 42 and recycled to line 18. If desired a portion of the mixture in line 42 can be recycled by line 44 to line 30 for recycle to drying chamber 20. Waste water is removed from the base of water stripper 40 by line 46.

The process of this invention can further be illustrated by reference to the following examples.

*Example I*

The difficulties which will ensue in the event it is attempted to dry a mixture containing higher alcohols without first separating therefrom materials boiling below about 160° to about 170° F. or otherwise following the distinct procedures outlined herein will be shown in the present example as well as Example II.

A raw alcohol charge which was obtained as a result of the partial oxidation of propane was passed through a hydrogenation reactor containing a 35 percent nickel on refractory base at a temperature of 330° F. and a pressure of 600 pounds per square inch gauge at a liquid hourly space velocity of 0.5. The hydrogenated product was charged to a water extractor with a weight ratio of water to feed of 2:1 and a top temperature of 175° to 190° F. and atmospheric pressure. The water contained 1.5 weight percent of sodium hydroxide. The bottoms product from the first extractor was sent to a second extractor operated under the same conditions as the first extractor. In each case the non-polar contaminants coming off overhead were recycled to the hydrogenation reactor. The bottoms from the second extractor were sent to a 60 plate distillation column, run at a 10–1 reflux ratio with a top temperature of 147° F. and atmospheric pressure where the methanol was removed as an overhead product and the higher alcohols as the bottoms product. The higher alcohols containing the bulk of the water were sent to a water stripper operated at a top temperature of 180° F. and atmospheric pressure, and a water-alcohol azeotrope, whose composition is shown in the table below, was removed as a top product, while waste water was removed as a bottoms product.

| Component: | Percent by Weight |
| --- | --- |
| Acetaldehyde | 0.6 |
| Methanol | 6.00 |
| Ethanol | 47.70 |
| Isopropanol | 19.00 |
| n-propanol | 5.57 |
| Butanols | 0.40 |
| Miscellaneous Acetals | 0.60 |
| Water | 20.67 |

The azeotropic mixture from the water stripper was added to an extractor with pentane using a 5:1 ratio of pentane to higher alcohols. After settling, the lower layer containing 4 percent pentane, 24 percent water and 72 percent alcohols was removed and sent to the water stripper. The top layer containing 97 percent pentane, 3.5 percent alcohol and 0.5 percent water was sent to a fractionator where a dry alcohol was removed as a bottoms product and a water-pentane-alcohol azeotrope was removed as a top product and returned to a pentane extractor. The yield of dry alcohol based on the amount in the original charge was 94 percent; thus, 6 percent of the alcohol was lost in the waste water.

*Example II*

Example I was repeated except that hexane was used in place of pentane. The yield of alcohol was no greater using hexane, but the time required to dry the alcohol was much shorter. Only 0.4 gallon per hour of higher alcohols were dried in Example I while 4 gallons per hour were dried in Example II.

*Example III*

In this example the procedure outlined in the accompanying drawing was followed. A hydrogenated raw alcohol stream obtained as a result of the partial oxidation of propane was fractionated at a top temperature of 165° F. to remove therefrom substantially all of the methanol and the remaining components boiling below 165° F. The following mixture was removed as a bottoms product from the distillation zone.

| Component: | Percent by Weight |
| --- | --- |
| Acetaldehyde | 0.02 |
| Methanol | 2.21 |
| Ethanol | 44.30 |
| Isopropanol | 17.59 |
| N-propanol | 11.60 |
| Butanols | 3.91 |
| Miscellaneous Acetals | 0.84 |
| Water | 19.53 |

Hexane was contacted with the above mixture using a 7.5 to one weight ratio of hexane to said mixture in a single stage extractor. The product from the extractor was allowed to settle and the bottoms phase containing hexane, water and higher alcohols, was removed and sent to a water stripper. The upper phase containing water, hexane and higher alcohols was sent to a drying tower operating at a top temperature of 130° F. and a pressure of 0 pounds per square inch gauge. The desired dry higher alcohol mixture was removed as a bottoms product from the drying tower. The top product, consisting of a water-alcohol-hexane azeotrope was sent to a second settler wherein 0.85 percent by weight of water, relative to said azeotrope, was also introduced therein. A hexane-alcohol upper phase was sent back to the drying tower as reflux. The bottoms phase, containing hexane, higher alcohols and water, was sent to the water stripper which was operated at a top temperature of 170° F. and a pressure of 0 pounds per square inch gauge. Waste water was removed from the water stripper as a bottoms product as well as an overhead stream containing water, alcohols and hexane. The overhead stream was sent back as charge or reflux to the drying tower. The higher alcohol product recovered by this procedure contained 0.76 percent by weight of water. No higher alcohols were lost in the waste water.

Obviously, many modifications and variations of the invention, as hereinabove set forth, can be made without departing from the spirit and scope thereof, and therefore only such limitations should be imposed as are indicated in the appended claims.

I claim:

1. A process for removing water from a mixture obtained as a result of the partial oxidation of a normally gaseous hydrocarbon and which comprises methanol, higher alcohols and water which comprises separating methanol from said mixture by distilling the same at a temperature of about 160° to about 170° F., extracting the remainder of said mixture with hexane, separating an extract mixture of hexane rich in said higher alcohols from said water, and thereafter removing hexane from said separated extract mixture, thereby recovering said higher alcohols.

2. A process for removing water from a mixture obtained as a result of the partial oxidation of a normally gaseous hydrocarbon and which comprises methanol, higher alcohols and water which comprises separating methanol from said mixture by distilling the same at a temperature of about 160° to about 170° F., extracting the remainder of said mixture with hexane, separating an extract mixture of hexane rich in said higher alcohols from said water, and thereafter removing hexane from said separated extract mixture by subjecting said separated extract mixture to a temperature of about 120° to about 140° F., thereby recovering said higher alcohols.

3. A process for removing water from a mixture obtained as a result of the partial oxidation of a normally gaseous hydrocarbon and which comprises methanol, higher alcohols and water which comprises separating methanol from said mixture by distilling the same at a temperature of about 160° to about 170° F., extracting the remainder of said mixture with hexane, separating an extract mixture of hexane rich in said higher alcohols from a first mixture rich in water, subjecting said hexane-rich mixture to a temperature of about 120° to about 140° F. whereby a separation of said hexane-rich mixture is effected into a fraction comprising said higher alcohols and an azeotrope fraction comprising water, hexane and the remainder of said higher alcohols, and thereafter recovering said higher alcohols in said azeotrope.

4. A process for removing water from a mixture obtained as a result of the partial oxidation of a normally gaseous hydrocarbon and which comprises methanol, higher alcohols and water which comprises separating methanol from said mixture by distilling the same at a temperature of about 160° to about 170° F., extracting the remainder of said mixture with hexane, separating an extract mixture of hexane rich in said higher alcohols from a first mixture rich in water, subjecting said hexane-rich mixture to a temperature of about 120° to about 140° F., whereby a separation of said hexane-rich mixture is effected into a fraction comprising said higher alcohols and an azeotrope fraction comprising water, hexane and the remainder of said higher alcohols, resolving said azeotrope into its individual members, recycling a mixture of higher alcohols and hexane obtained from said azeotrope to the zone wherein said hexane-rich mixture is subjected to said elevated temperature, combining a mixture of higher alcohols and water also obtained from said azeotrope with said first mixture rich in water, and thereafter recovering the higher alcohols in said combined mixture.

5. A process for removing water from a mixture obtained as a result of the partial oxidation of a normally gaseous hydrocarbon and which comprises methanol, higher alcohols and water which comprises separating methanol from said mixture by distilling the same at a temperature of about 160° to about 170° F., extracting the remainder of said mixture with hexane, separating an extract mixture of hexane rich in said higher alcohols from a first mixture rich in water, subjecting said hexane-rich mixture to a temperature of about 120° to about 140° F., whereby a separation of said hexane-rich mixture is effected into a fraction comprising said higher alcohols and an azeotrope fraction comprising water, hexane and the remainder of said higher alcohols, resolving said azeotrope into its individual members, recycling a mixture of higher alcohols and hexane obtained from said azeotrope to the zone wherein said hexane-rich mixture is subjected to said elevated temperature and to said extracting zone, combining a mixture of higher alcohols and water also obtained from said azeotrope with said first mixture rich in water, subjecting said combined mixture to a temperature of about 160° to about 180° F., whereby said combined mixture is separated into a fraction containing waste water and a fraction containing water and alcohol, and thereafter recycling said last fraction to the zone wherein said hexane-rich mixture is subjected to said elevated temperature.

References Cited in the file of this patent

UNITED STATES PATENTS

| | | |
|---|---|---|
| 1,568,349 | Steffens | Jan. 5, 1926 |
| 2,033,684 | Coleman et al. | Mar. 10, 1936 |
| 2,175,080 | Evans | Oct. 3, 1939 |
| 2,470,222 | Patterson | May 17, 1949 |
| 2,492,098 | Kelly | Dec. 20, 1949 |